(12) United States Patent
Storm et al.

(10) Patent No.: US 7,809,108 B1
(45) Date of Patent: Oct. 5, 2010

(54) METHOD AND APPARATUS FOR GENERATING SMALL SIZE, HIGH-INTENSITY X-RAY BEAMS

(75) Inventors: Arjen B. Storm, Delft (NL); Robertus W. W. Hooft, Gravenzande (NL); Leendert J. Seijbel, Rotterdam (NL)

(73) Assignee: Bruker AXS, Inc., Madison, WI (US)

( * ) Notice: Subject to any disclaimer, the term of this patent is extended or adjusted under 35 U.S.C. 154(b) by 40 days.

(21) Appl. No.: 12/024,488

(22) Filed: Feb. 1, 2008

(51) Int. Cl.
*G21K 1/06* (2006.01)

(52) U.S. Cl. .......................................... 378/84
(58) Field of Classification Search ............... 378/84, 378/85
See application file for complete search history.

(56) References Cited

U.S. PATENT DOCUMENTS 5,204,887 A * 4/1993 Hayashida et al. .......... 378/145
7,245,699 B2 * 7/2007 Verman et al. .............. 378/85

* cited by examiner

*Primary Examiner*—Chih-Cheng G Kao
(74) *Attorney, Agent, or Firm*—Law Offices of Paul E. Kudirka

(57) ABSTRACT

In an X-ray diffraction apparatus, a high brightness source, such as a rotating anode generator, is combined with demagnification X-ray optics to produce a beam with small image size and high-intensity. In one embodiment, an elliptical X-ray optic is positioned relative to the source and image focal points so that the magnification of the optic is less than one. The combination can produce high-intensity beams with beam images at the sample of less than 0.1 mm.

20 Claims, 5 Drawing Sheets

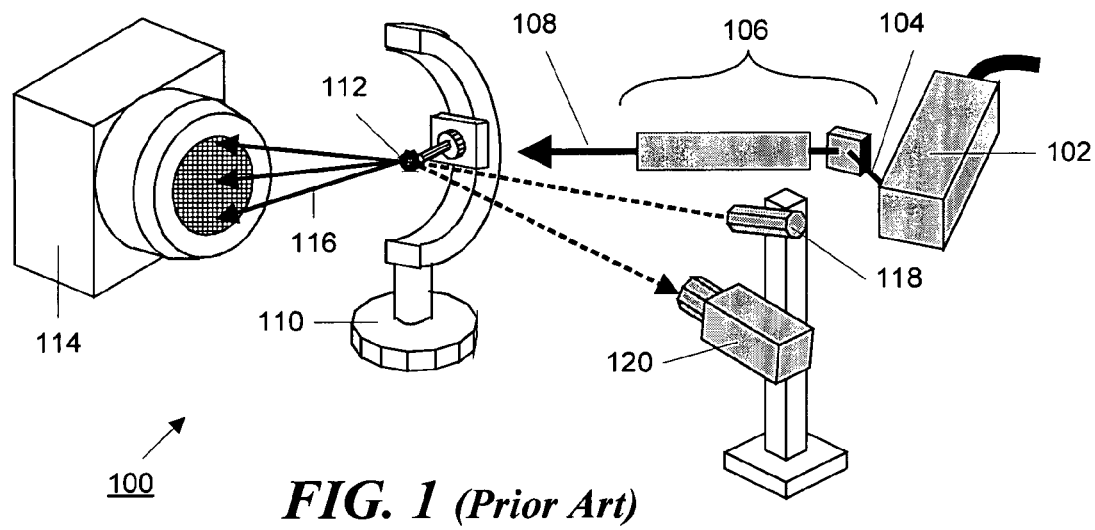
FIG. 1 *(Prior Art)*
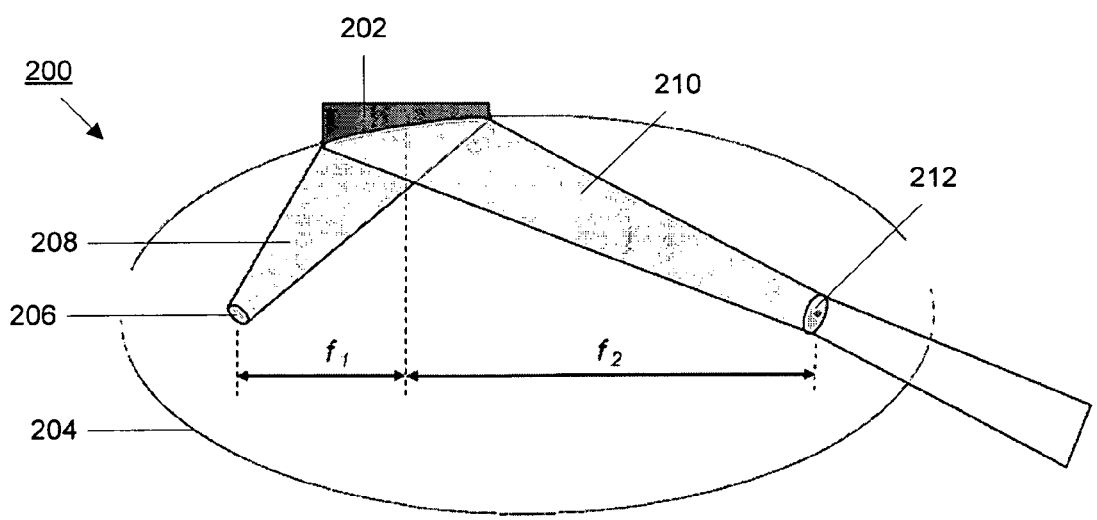
FIG. 2 *(Prior Art)*

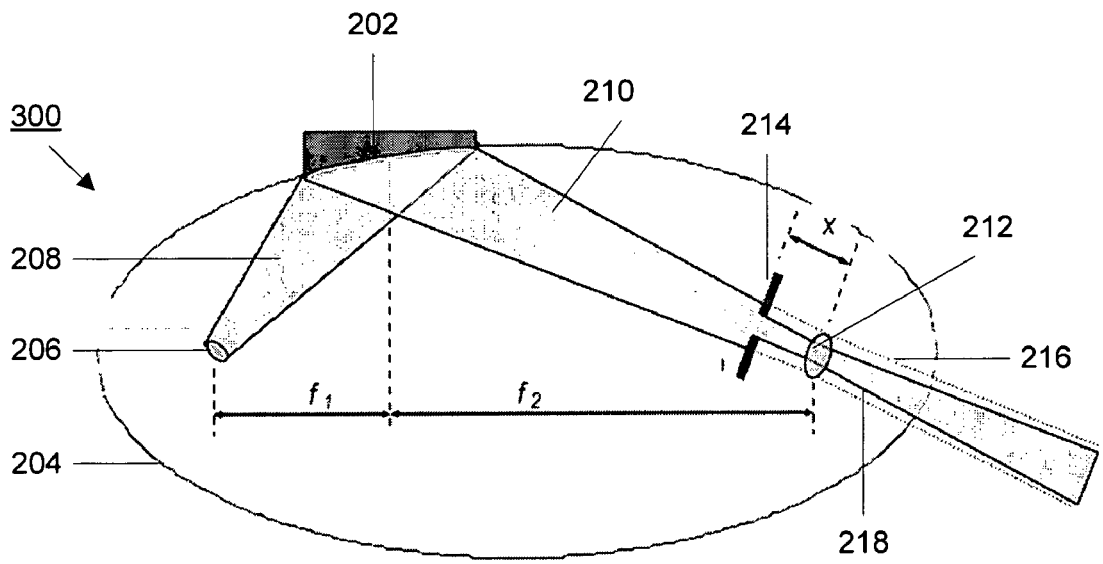
FIG. 3 *(Prior Art)*
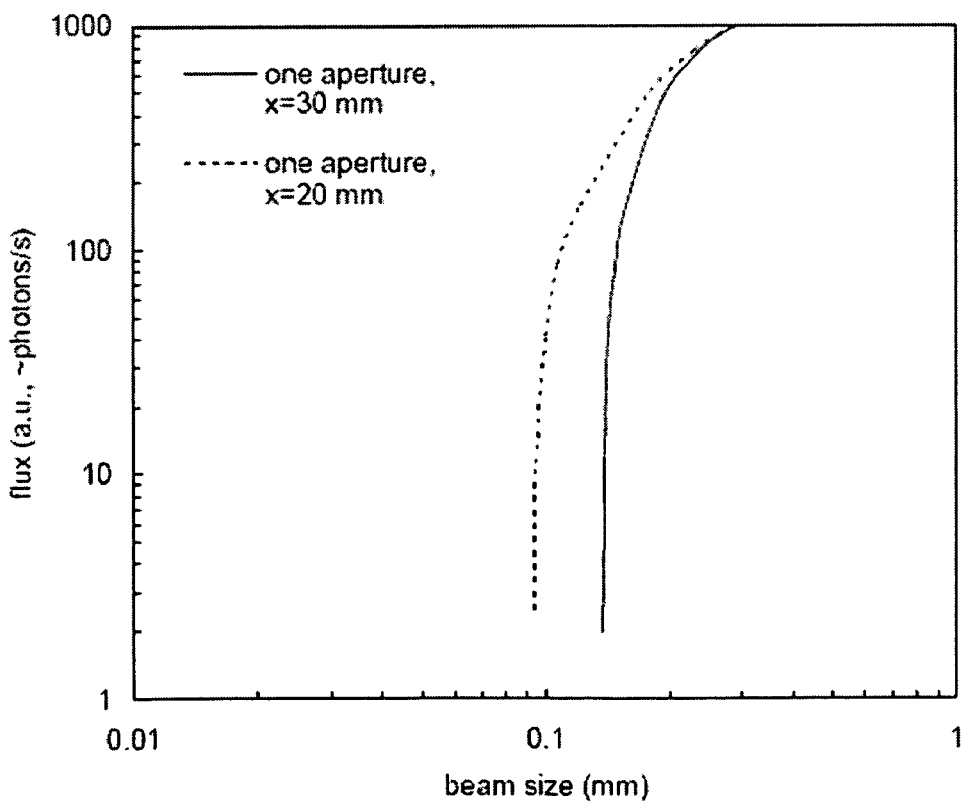
FIG. 4 *(Prior Art)*

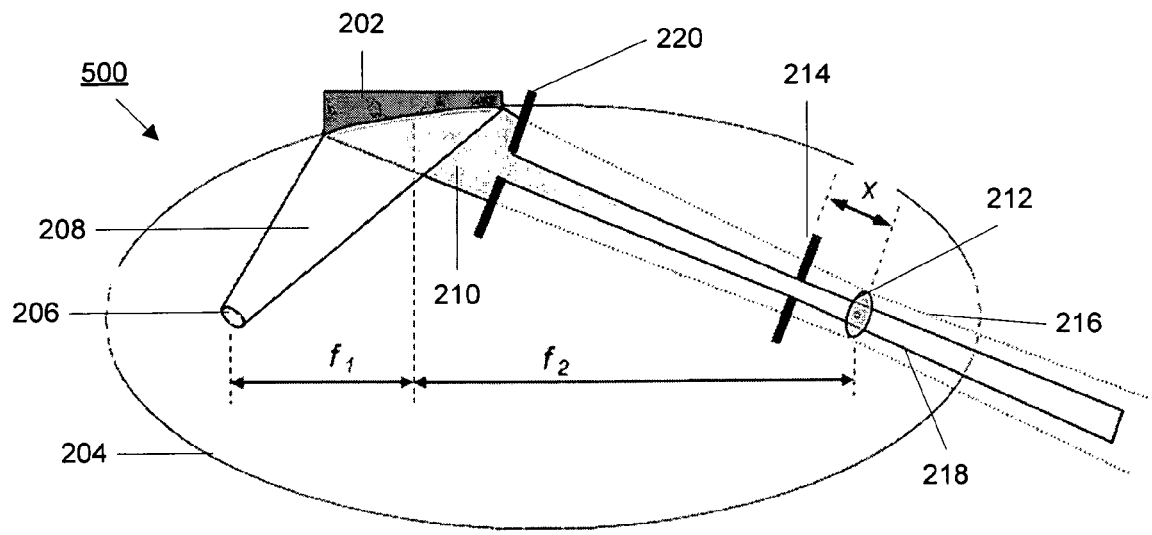
FIG. 5 *(Prior Art)*
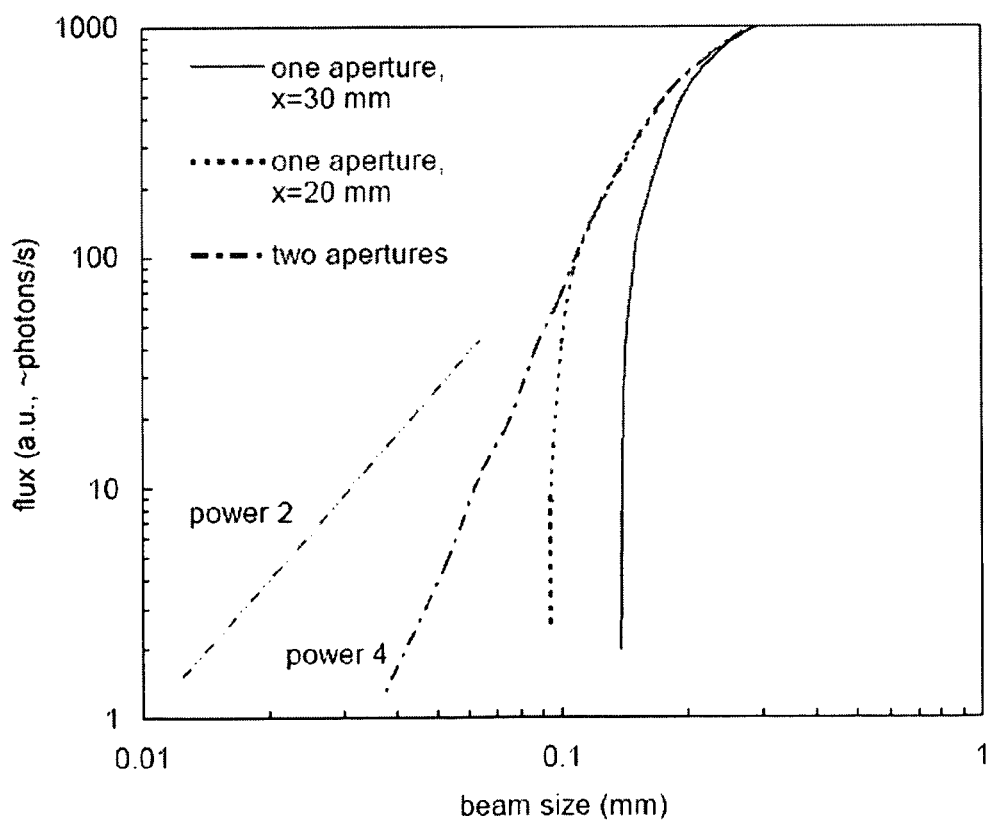
FIG. 6 *(Prior Art)*

METHOD AND APPARATUS FOR GENERATING SMALL SIZE, HIGH-INTENSITY X-RAY BEAMS

BACKGROUND

This invention relates to X-ray diffraction systems. X-ray diffraction is a non-destructive technique for the qualitative and quantitative analysis of crystalline material samples, which are generally provided in the form of crystals or powders. In accordance with this technique, an X-ray beam is generated by an X-ray tube with a stationary anode, by a conventional rotating anode X-ray source or by a synchrotron source and directed toward the material sample under investigation. When the X-rays strike the sample, they are diffracted according to the atomic structure of the sample.

A typical laboratory system 100 for performing single crystal diffraction experiments normally consists of five components as shown in FIG. 1. The components include an X-ray source 102 that produces a primary X-ray beam 104 with the required radiation energy, focal spot size and intensity. X-ray optics 106 are provided to condition the primary X-ray beam 104 to a conditioned, or incident, beam 108 with the required wavelength, beam focus size, beam profile and divergence. A goniometer and stage 110 are used to establish and manipulate geometric relationships between the incident X-ray beam 108, the crystal sample 112 and the X-ray detector 114. The incident X-ray beam 108 strikes the crystal sample 112 and produces scattered X-rays 116 which are recorded in the detector 114. A sample alignment and monitor assembly comprises a sample illuminator 118, typically a laser, that illuminates the sample 112 and a sample monitor 120, typically a video camera, which generates a video image of the sample to assist users in positioning the sample in the instrument center and monitoring the sample state and position.

In order to increase the X-ray intensity at the crystal sample, focusing optics are routinely used. The X-ray beam path 200 of a typical single crystal diffraction set-up is schematically shown in FIG. 2. In this set-up, a multi-layer focusing X-ray optic 202 is used. Optic 202 has a focusing surface that is part of an ellipse, schematically shown as 204 in FIG. 2. An X-ray source 206 is placed at a first focal point of optic 202. This source generates X-rays 208 that are redirected by optic 202 to form a focused and redirected beam 210, which is focused on an image 212 at the second focal point. The sample is placed at the position of the image 212. The source and image focal points are located at distances $f_1$ and $f_2$ from the middle of the optic 202, respectively.

Most applications require an X-ray beam that is large enough to completely illuminate the sample. Single crystal diffraction systems are thus designed to produce an image at the sample location with a size, or diameter, that is comparable in size to the dimension of a typical sample, which is a few tenths of a millimeter. However, some applications require much smaller image sizes. For example, in some applications, diffraction data produced from only a part of the sample must be obtained. Such local analysis could be needed if the sample contains different parts with different properties. To study these parts separately, the sample must be illuminated with a beam image smaller than the sample. In particular, a method to make a beam with an image size smaller than 0.1 mm is thus desired.

Traditionally, X-ray image size is made smaller by placing apertures in-between the X-ray optic and image focal point. This is routinely done in commercial diffraction equipment, such as the X8 Proteum X-ray diffraction system manufactured and sold by Bruker AXS Inc., Madison, Wis. In the simplest case, one aperture is placed close to the image focal point, as shown in FIG. 3. In this set-up 300, aperture 214 has been added to the set-up illustrated in FIG. 2. The resulting beam 218 is smaller than the original beam (shown as dotted lines 216). The beam image can be made smaller and smaller by using smaller and smaller apertures, but there is a limit. For an infinitely small aperture the image size of the image 212 is determined by the distance (x) between the aperture 214 and the image focal point times the beam divergence.

Ray-tracing illustrates the limitations of an aperture to reduce the image size. The X-ray flux and beam size (at the image focal point) were calculated for a range of aperture diameters and are shown in FIG. 4 for two aperture distances: x=20 mm and x=30 mm. In these calculations, the flux numbers have been normalized. In the calculations, an optic with $f_1/f_2=100$ mm/300 mm, a divergence of 4.5 mrad and a source diameter of 0.1 mm were assumed. These parameters are typical for protein single crystal diffraction systems and represent a realistic situation. The results show that an aperture is capable of reducing the image size, but only for large sized beams. For smaller sized beams, the flux quickly reduces and image sizes beyond a minimum size are not practical because the flux is so low.

Positioning the aperture closer to the sample extends the range of image sizes, but this range is also limited because of practical reasons. Some space between aperture and sample must be kept clear, for example, to accommodate an additional aperture to block scattered radiation or to allow for handling of the sample. Consequently, the aperture cannot be placed exactly at the sample (x=0). Accordingly, there is a limit on the smallest image size.

The image size can be reduced further by the introduction of a second aperture, as illustrated in the arrangement 500 shown in FIG. 5. This aperture 220, placed close to the X-ray optic 202, reduces the divergence and thus the intensity of the beam 210. With a reduced divergence, the aperture 214 close to the image area 212 is much more capable of reducing the image size.

FIG. 6 shows ray-tracing results of the arrangement shown in FIG. 5, with two optimized apertures using the same parameters as in FIG. 4. As can be seen in FIG. 6, the introduction of a second aperture does enable the generation of smaller sized beams, but the beam flux quickly diminishes. In the ideal case, a one-aperture system reduces only the size and not the intensity of the beam whereas a two-aperture system reduces both the size and intensity. The end effect of the combined apertures is that the flux in a small sized beam is not reduced by the square of the reduction in the beam diameter (as would be the ideal case shown by the dotted line in FIG. 6), but by the fourth power. This quickly leads to a flux too small to be useful in case of beam images smaller than 0.1 mm.

Another conventional method for producing a small image size is to use a small source size. For example, in FIG. 2, the optic 202 magnifies the source 206 with a magnification factor $M=f_2/f_1$. If the source 206 has a size S the resulting beam image A at the sample 212 is then M times S (A=MS). Consequently, the beam image size can be made small by reducing the source size, S and using a low magnification, M. In one prior art device, a micro-focus tube is combined with a focusing optic with a magnification of one. The small source of a micro-focus tube produces a small beam, but the X-ray beam brightness at the sample is only slightly larger than a conventional sealed tube using apertures. Consequently, a method to make beams that are both small and intense is thus desired.

SUMMARY

In accordance with the principles of the invention, a high brightness source, such as a rotating anode generator, is combined with demagnification X-ray optics to produce a beam with small image size and high-intensity.

In one embodiment, an elliptical X-ray optic is positioned relative to the source and image focal points so that the magnification of the optic is less than one.

In another embodiment, apertures are used either at the entrance or the exit of the optic in order to reduce beam divergence.

In yet another embodiment, apertures are used near the sample focal point in order to further limit the beam image size.

In still another embodiment, slits and apertures can be located along the beam path in order to remove scattered radiation.

BRIEF DESCRIPTION OF THE DRAWINGS

FIG. 1 shows a conventional laboratory X-ray diffraction system.

FIG. 2 is a schematic diagram showing the relationship of a source, beam image and X-ray optics and the X-ray beam path in a conventional X-ray diffraction system.

FIG. 3 is a schematic diagram of the arrangement of FIG. 2 with an aperture inserted between the X-ray optic and the image focal point to illustrate a method of reducing beam image size.

FIG. 4 is a graph of X-ray flux versus X-ray beam size for two aperture distances calculated by ray tracing analysis for a range of aperture diameters for the arrangement shown in FIG. 3.

FIG. 5 is a schematic diagram of the arrangement of FIG. 2 with two apertures inserted between the X-ray optic and the image focal point to illustrate another method of reducing beam image size at the sample.

FIG. 6 is a graph of X-ray flux versus X-ray beam size for two aperture distances calculated by ray tracing analysis for a range of aperture diameters including for comparison, the single aperture curve shown in FIG. 4 and curves for the two-aperture arrangement shown in FIG. 5.

DETAILED DESCRIPTION

In accordance with the principles of the invention, a high brightness source, such as a rotating anode generator, is combined with demagnification X-ray optics to produce a beam with small size and high-intensity. In particular, modern rotating anode X-ray generators (RAGs) are much brighter than micro-focus sources and are thus preferred as a source. However, the source size of a RAG is significantly larger than the source size of a micro-focus source. Consequently, a RAG source must be combined with de-magnifying optics in order to produce a system that has both small beam size and high intensity.

Figure 7:
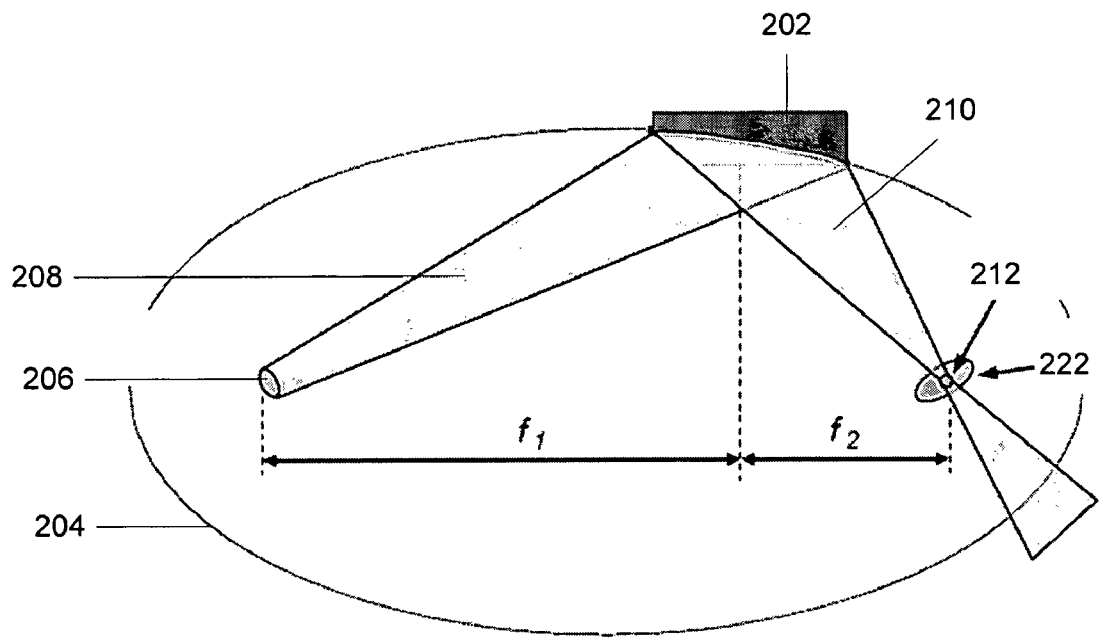
FIG. 7 a schematic diagram showing the relationship of a source, image and X-ray optics and the X-ray beam path in an X-ray diffraction system constructed in accordance with the principles of the invention.

Such an arrangement is shown in FIG. 7. In this arrangement, the X-ray optic 202 has been repositioned relative to the source 206 and the image focal point 212 so that the magnification (M) of the X-ray optic 202 is less than one (M<1). With this arrangement, the beam image 212 size is smaller than the source 206 size and can be smaller than the sample 222.

Figure 8:
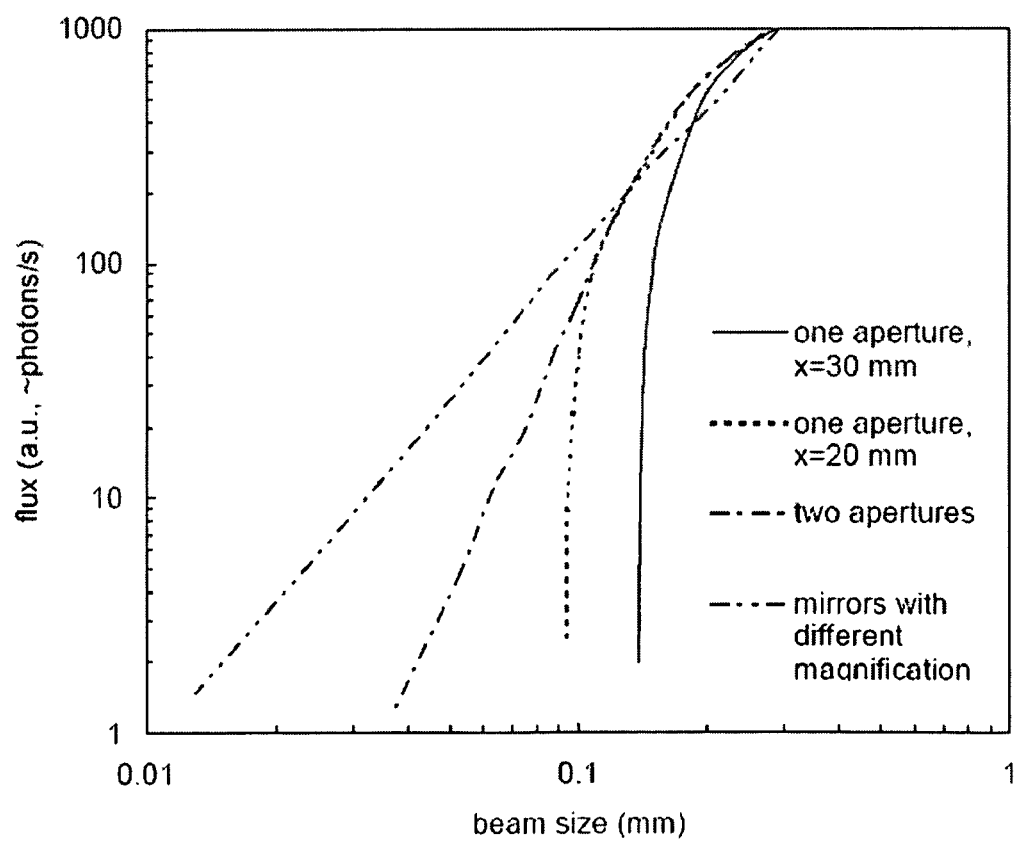
FIG. 8 is a graph of X-ray flux versus X-ray beam size for two aperture distances calculated by ray tracing analysis for a range of aperture diameters including the curves shown in FIG. 6 for comparison, and an additional curve for the arrangement shown in FIG. 7.

FIG. 8 shows ray-tracing results of a source-optic combinations with different optic magnifications. As in FIGS. 4 and 6, two aperture distances: x=20 mm and x=30 mm are illustrated. In the calculations, the flux numbers have been normalized and an optic 202 with $f_1/f_2$=300 mm/100 mm, a divergence of 4.5 mrad and a source diameter of 0.1 mm were assumed. As with the arrangements using apertures, the source-optic combination in FIG. 7 provides very small beam images but, as illustrated in FIG. 8, the beam flux is much larger. As shown in FIGS. 4 and 6, apertures are effective in producing beams with images down to typically 0.1 mm, but below this image size the inventive source-optic combinations provide superior beam image sizes.

In another embodiment, if the beam image size obtained with the inventive arrangement is still not small enough, apertures placed close to the sample or at the exit of the optic can be used to make the beam image even smaller. In all the proposed situations scatter limiting slits or apertures can be used throughout the beam path.

The following is an example in which a specially designed optic is used for local diffraction analyses with a small X-ray beam. The example involves retrieving diffraction data from an area with size A of 50 μm on a protein crystal with a size of 200 μm. The X-ray source used in the illustrative set-up has a size S of 100 μm. The anode is made from copper and produces Cu—Kα photons with energy of 8041 eV. The divergence of the beam must be small enough to resolve d-spacings up to 330 Å, which is reached for a divergence of 3.3 mrad, or less. These specifications are typical for local diffraction analyses of proteins using a modern rotating anode X-ray generator.

Figure 9:
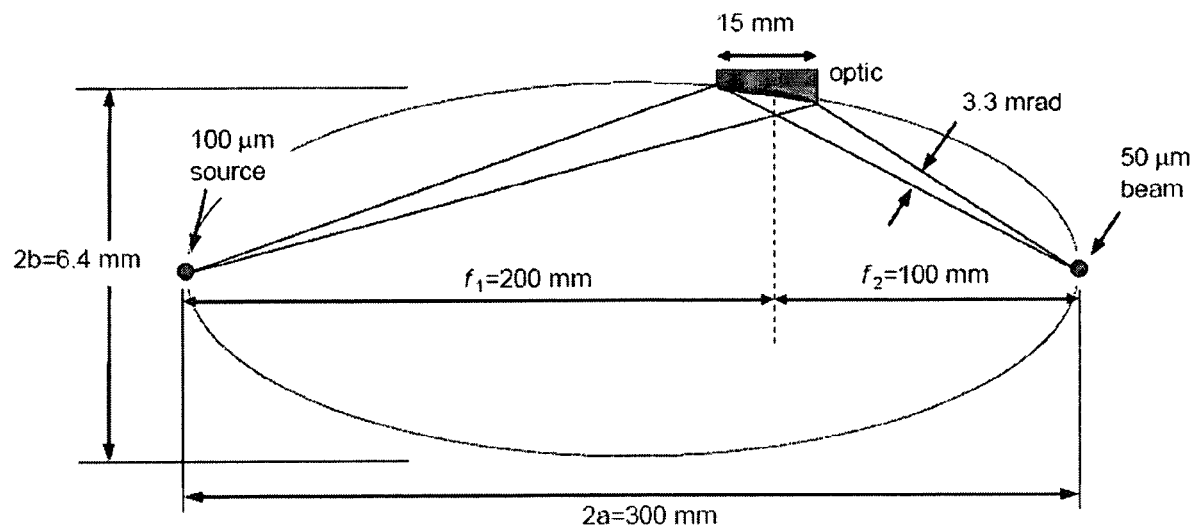
FIG. 9 is an illustrative example of an optic designed in accordance with the principles of the invention.

To generate a beam with a 50 μm beam size at the sample, the X-ray optic must de-magnify the source by a factor of two. The following optic design fulfils the specifications: elliptically shaped optic with $f_1$=200 mm and $f_2$=100 mm, long ellipse axis a 150 mm, short ellipse axis b 3.2 mm and length L 15 mm. This arrangement is illustrated in FIG. 9. Note that this design satisfies the condition A=S $f_2/f_1$. The geometry is further chosen such that the resulting divergence is 3.3 mrad, satisfying the resolving power specification. The short ellipse axis is much smaller than the long ellipse axis and the ellipse focal points are therefore almost at the ellipse edges. The sum of the focal lengths therefore approximately equals twice the long ellipse axis: $f_1+f_2 \approx 2a$. The actual ellipse is flatter than the ellipse shown in FIG. 9, which for clarity, is drawn with a different vertical scale. Finally, the optic is coated with a multilayer to increase the reflectivity and to monochromize the beam.

Figure 10:
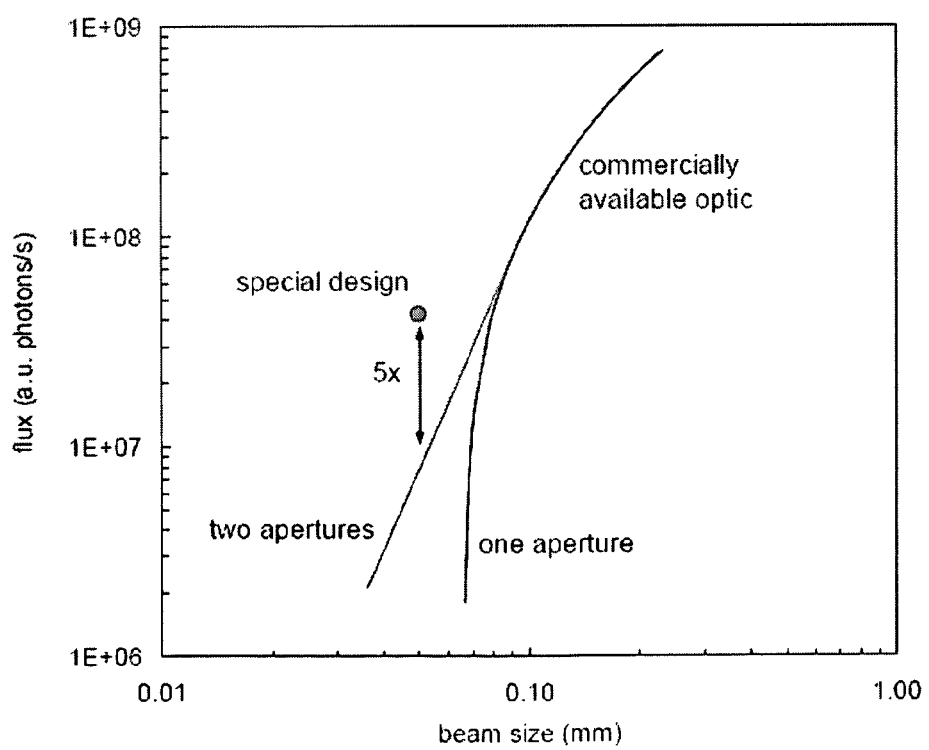
FIG. 10 is a graph showing ray tracing results for the optic design shown in FIG. 9 and a commercially available optic.

The specially designed optic provides much more flux than another optic that requires apertures to reduce the beam size. FIG. 10 shows ray tracing results for the specially designed optic shown in FIG. 9 and a commercially available optic. The commercial optic has elliptical surfaces with $f_1$=120 mm, $f_2$=380 mm and produces a beam with a divergence of 3.3 mrad. In a first situation, the beam from the commercial optic is reduced in size with only one aperture positioned close to the crystal. In a second situation, an additional aperture is placed close to the optic exit. Different aperture sizes result in a different flux and beam size, which are shown in the graph as lines. To achieve the 50 μm beam size with the commercial optic, two apertures are required, as one aperture is not sufficient. The specially designed optic does not need any aperture to produce a 50 μm beam. In addition, the flux is five times larger than for the commercial optic. This much larger flux shows the benefit of an optic that is designed according to the described invention.

While the invention has been shown and described with reference to a number of embodiments thereof, it will be recognized by those skilled in the art that various changes in form and detail may be made herein without departing from the spirit and scope of the invention as defined by the appended claims.

What is claimed is:

1. An X-ray diffraction apparatus comprising:
   a rotating anode X-ray generator with a source size S for generating an X-ray beam;
   a focusing multilayer X-ray optic with a magnification M such that M times S is smaller than 0.1 mm and which receives the X-ray beam at an entrance and produces at an exit a beam that is focused at a focal point;
   a sample holder for positioning a sample at the focal point; and
   an X-ray detector for detecting X-rays scattered from the sample, wherein the X-ray diffraction apparatus determines an energy and scattering angle of X-rays scattered from the sample.

2. The X-ray diffraction apparatus of claim 1 further comprising an aperture located at the exit of the optic to reduce beam divergence.

3. The X-ray diffraction apparatus of claim 2 wherein the aperture is a slit.

4. The X-ray diffraction apparatus of claim 1 further comprising a second aperture located near the focal point in order to optimize a beam image size at the focal point.

5. The X-ray diffraction apparatus of any one of claims 1-4 further comprising one of a slit and an aperture located along a beam path from the X-ray generator to the focal point in order to remove scattered radiation.

6. The X-ray diffraction apparatus of claim 1 further comprising an aperture located at the entrance of the optic in order to reduce beam divergence.

7. The X-ray diffraction apparatus of claim 6 wherein the aperture is a slit.

8. The X-ray diffraction apparatus of claim 6 further comprising a second aperture located near the focal point in order to optimize a beam image size at the focal point.

9. The X-ray diffraction apparatus of any one of claims 6-8 further comprising one of a slit and an aperture located along a beam path from the X-ray generator to the focal point in order to remove scattered radiation.

10. The X-ray diffraction apparatus of claim 1 wherein the magnification is less than one.

11. A method for performing an X-ray diffraction measurement with a rotating anode X-ray generator with a source size S that generates an X-ray beam, the method comprising:
    (a) providing a focusing multilayer X-ray optic with a magnification M such that M times S is smaller than 0.1 mm and having a beam entrance and a beam exit;
    (b) receiving the X-ray beam at the beam entrance to produce at the beam exit an X-ray beam that is focused at a focal point;
    (c) positioning a sample at the focal point; and
    (d) determining an energy and scattering angle of X-rays scattered from the sample.

12. The method of claim 11 further comprising placing an aperture at the beam exit of the optic to reduce beam divergence.

13. The method of claim 12 wherein the aperture is a slit.

14. The method of claim 12 further comprising placing a second aperture near the focal point in order to optimize a beam image size at the focal point.

15. The method of any one of claims 11-14 further comprising placing one of a slit and an aperture along a beam path from the X-ray generator to the focal point in order to remove scattered radiation.

16. The method of claim 11 further comprising placing an aperture at the entrance of the optic in order to reduce beam divergence.

17. The method of claim 16 wherein the aperture is a slit.

18. The method of claim 16 further comprising placing a second aperture near the focal point in order to optimize a beam image size at the focal point.

19. The method of any one of claims 16-18 further comprising placing one of a slit and an aperture along a beam path from the X-ray generator to the focal point in order to remove scattered radiation.

20. The method of claim 11 wherein the magnification is less than one.

* * * * *